United States Patent [19]

Itakura et al.

[11] Patent Number: 4,461,844

[45] Date of Patent: Jul. 24, 1984

[54] CERAMIC COMPOSITION OF HIGH DIELECTRIC CONSTANT

[75] Inventors: Gen Itakura, Osaka; Takayuki Kuroda, Hyogo, both of Japan

[73] Assignee: Matsushita Electric Industrial Co., Ltd., Osaka, Japan

[21] Appl. No.: 483,610

[22] Filed: Apr. 11, 1983

[30] Foreign Application Priority Data

Sep. 20, 1982 [JP] Japan .................................. 57-164643

[51] Int. Cl.³ .......................... C04B 35/46; C04B 35/50
[52] U.S. Cl. ..................................... 501/137; 501/152
[58] Field of Search ................ 501/137, 138, 139, 152

[56] References Cited

U.S. PATENT DOCUMENTS

| | | | |
|---|---|---|---|
| 2,469,584 | 5/1949 | Wainer et al. | 501/135 |
| 3,268,783 | 8/1966 | Saburi | 501/139 |
| 3,764,529 | 10/1973 | Matsuo et al. | 501/139 |
| 4,404,029 | 9/1983 | Iwaya et al. | 501/139 |

FOREIGN PATENT DOCUMENTS 51-87799  7/1976  Japan ................................... 501/152

*Primary Examiner*—Helen M. McCarthy
*Attorney, Agent, or Firm*—Burgess, Ryan & Wayne

[57] ABSTRACT

A ceramic composition of a high dielectric constant is provided, which consists of 100 mol parts of barium metatitanate ($BaTiO_3$), $(\frac{2}{3})(7\pm1)$ mol parts of cerium dioxide, and $7\pm1$ mol parts of titanium dioxide ($TiO_2$), and to which 0.05 to 0.2 mol part of $MnO_2$ is added. The ceramic composition has a ceramic microstructure in which a grain size is as small as 2 to 3 $\mu$m and a pore size is small to be not more than 3 $\mu$m. The ceramic composition has a high dielectric constant of about 10,000, a high breakdown voltage, and little dependency on voltage. The ceramic composition is very suitable as a thin dielectric film for a laminated ceramic chip capacitor.

1 Claim, 8 Drawing Figures

→ AMOUNT OF MnO$_2$ ADDED

→ AMOUNT OF $MnO_2$ ADDED

CERAMIC COMPOSITION OF HIGH DIELECTRIC CONSTANT

BACKGROUND OF THE INVENTION

I. Field of the Invention

The present invention relates to a ceramic composition of a high dielectric constant which essentially consists of barium titanate and has a ceramic microstructure, and which is primarily used for a ceramic capacitor.

II. Description of the Prior Art

It is conventionally known that barium titanate as a major component have been used as materials for various ceramic capacitors. As a matter of fact, barium titanate has ferroelectric characteristics. More particularly, isometric perovskite barium titanate is obtained at a high temperature; tetragonal barium titanate where the crystal is slightly elongated along the C-axis is obtained at a temperature below 120° C.; orthorhombic barium titanate is obtained at a temperature of about 0° C.; and rhombic barium titanate is obtained at a temperature of about −80° C. The phase transition point at the temperature of about 120° C. is especially called the Curie point. Barium titanate shows paraelectric characteristics at a higher temperature than the Curie point, whereas it shows ferroelectric characteristics at a lower temperature than the Curie point. The dielectric constant of barium titanate is as high as 10,000 at the Curie point. It is thus noted that barium titanate by itself does not have a high dielectric constant at room temperature. Various compact capacitors are commercially available in which the high dielectric constant of barium titanate at about the Curie point is obtained at a temperature lower than this point so as to allow the capacitor to have a proper (electrostatic) capacitance at room temperature. The peak value of the dielectric constant at a high temperature can be shifted by additives so as to obtain the peak value at a lower temperature. These additives are called a shifter and are generally selected from a stannate such as $BaSnO_3$, $SrSnO_3$, $CaSnO_3$, $PbSnO_3$, $CuSnO_3$, $ZnSnO_3$ and $CdSnO_3$; a zirconate such as $BaZrO_3$, $CaZrO_3$ and $SrZrO_3$; and a titanate such as $SrTiO_3$ and $PbTiO_3$. The effect of the shifter is greatest for a stannate, followed by a zirconate and a titanate, in that order.

A barium titanate compound containing a shifter has been used for a ceramic capacitor of a single sheet lead type. Meanwhile, a laminate chip manufacturing technique has been recently developed, so that a dielectric sheet of 30 to 100 μm thickness can be easily obtained. A laminate ceramic chip capacitor is then developed having a structure in which a set of thin dielectric sheets sandwiched between electrodes is laminated together. The laminate ceramic chip capacitors have been widely used in various types of electronic equipment. In this manner, the conventional dielectric ceramic composition is often utilized as a thin laminate dielectric sheet. However, the laminate ceramic chip capacitor has a dielectric of 10 to 20 μm thickness, whereas the conventional single-sheet ceramic capacitor has a dielectric of 100 to 10,000 μm thickness. As a result, the laminate ceramic chip capacitor is adversely affected by the intensity of the electric field about 5 to 10 times as much as is the conventional capacitor. For this reason, a strong demand has arisen for a composition which is less dependent on voltage. Furthermore, when the dielectric layer is thin, crystal defects of the ceramic material tend to affect electrical characteristics of the capacitor. As a result, the ceramic material must have a uniform grain size and a small number of pores each having a small diameter.

In order to meet the above-mentioned demands, inventors of the present invention have proposed a ceramic composition which has a high dielectric constant, a small number of crystal defects, little dependency on voltage, and a high breakdown voltage. This ceramic composition of a high dielectric constant essentially consists of 100 mol parts of barium metatitanate ($BaTiO_3$), ($\frac{8}{3}$)(7 ±1) mol parts of cerium dioxide ($CeO_2$), and 7±1 mol parts of titanium dioxide ($TiO_2$).

This ceramic composition of a high dielectric constant has a ceramic microstructure in which a grain size and a pore diameter are small. At the same time, the ceramic composition has a high dielectric constant, a high breakdown voltage and little dependency on voltage. However, the above ceramic composition has a small disadvantage in that the composition has a relatively low insulation resistance, and the electrodes are visible through the thin dielectric layers, since the ceramic composition is vivid red, when the thin dielectric layer is alternately laminated with the electrode.

SUMMARY OF THE INVENTION

It is an object of the present invention to provide an improved ceramic composition of a high dielectric constant which solves the disadvantage presented by the above-mentioned ceramic composition.

In order to achieve the object of the present invention, manganese dioxide ($MnO_2$) is added in a small amount to the ceramic composition which consists of 100 mol parts of $BaTiO_3$, ($\frac{8}{3}$)(7 ±1) mol parts of $CeO_2$, and 7 ±1 mol parts of $TiO_2$.

In this composition, the insulation resistance is further improved, and the brightness of the ceramic color is decreased so as not to allow the palladium electrodes to be readily seen through the dielectric layers, thus improving the product image of the capacitors.

Other objects, features, and advantages of the present invention will be apparent from the following description taken in conjunction with the accompanying drawings.

DETAILED DESCRIPTION OF THE PRIOR ART

Figure 1:
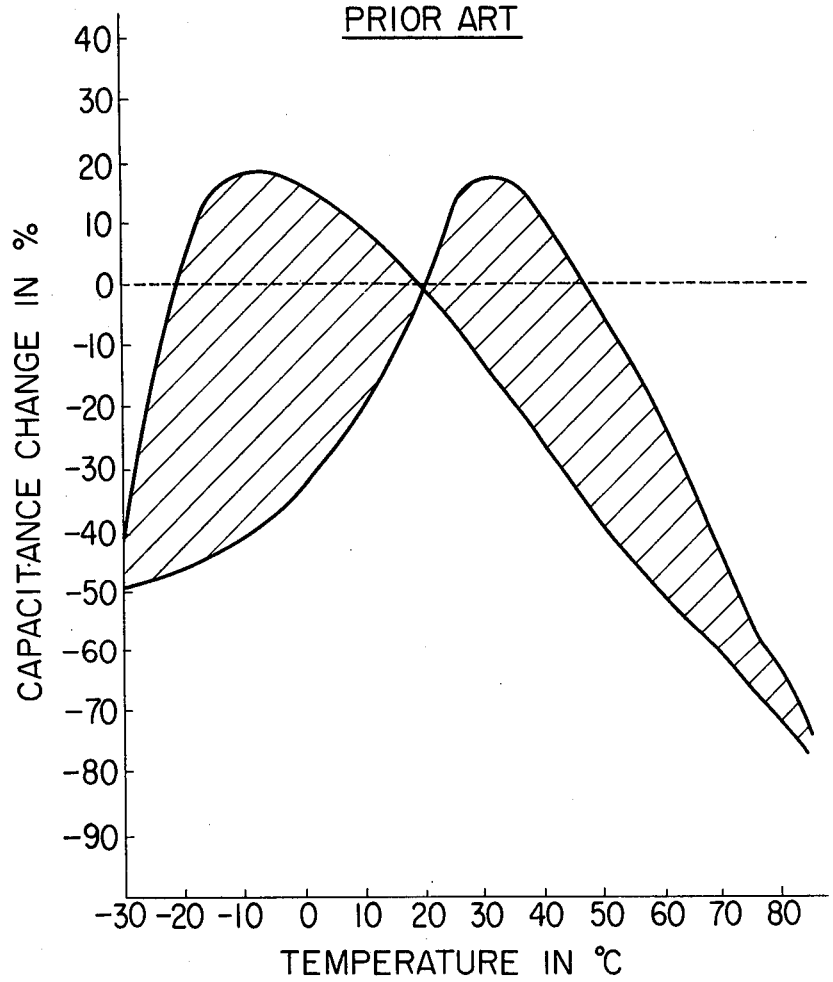
FIG. 1 is a graph for explaining a change in capacitance as a function of the temperature of a ceramic composition which was proposed previously by the inventors of the present invention.

A ceramic composition which was proposed previously by the inventors of the present invention will be described in detail below.

Barium metatitanate ($BaTiO_3$) is prepared by mixing barium carbonate ($BaCO_3$) and titanium dioxide ($TiO_2$) such that a ratio of Ba to Ti is 1.000±0.005:1. The resultant mixture is then calcined at a temperature of 1,100° to 1,150° C. and is pulverized. $CeO_2$ and $TiO_2$ are then added to the pulverized grains such that a ratio of Ce to Ti is 2:3. After $BaTiO_3$ is mixed with $CeO_2$ and $TiO_2$, a binder is then added to the mixture of $BaTiO_3$, $CeO_2$ and $TiO_2$. A square sheet is formed of the resultant mixture, and is then calcined at at temperature range of 1,250° to 1,350° C. Thereafter, silver electrodes are formed on the square sheet.

Table 1 shows the electrical characteristics of the square sheets when each sample is calcined at different temperatures.

−30° C. to +85° C. The capacitors made of the above compositions have the same dielectric constant as the dielectric constant (10,000) of a commercially available ceramic capacitor (Y 5V). The conventional compositions which have a zirconate additive and which are used for Y 5V capacitors are shown in the lowest row of Table 1. The grain size of the ceramic material which was proposed previously by the inventors of the present invention is 2 to 3 μm; and a maximum pore size thereof is about 3 μm. However, the grain size of the conventional ceramic material is as large as 10 to 20 μm; and a maximum pore size thereof is as large as 20 μm. Differences in the grain size and the pore size of the microstructures result in an improvement of electrical characteristics of a laminated ceramic chip capacitor using a thin dielectric film.

A laminated ceramic chip capacitor is prepared by using the material indicated by composition No. 3 at a calcination temperature of 1,300° C. Comparison results between the ceramic chip capacitor described above and a zirconate type laminated ceramic chip capacitor are shown in Table 2. It is noted that in FIG. 2 reference numeral 1 denotes dielectric layers each having a thick-

TABLE 1

| Composition No. | Composition (mol part) | | | T (°C.) | G (μm) | P (μm) | ε | tanδ (%) | IR (MΩ) | BDV (kV/mm) | T.C (%) | |
|---|---|---|---|---|---|---|---|---|---|---|---|---|
| | $BaTiO_3$ | $CeO_2$ | $TiO_2$ | | | | | | | | −30 (°C.) | +85 (°C.) |
| 1* | 100 | 10/3 | 5 | 1250 | 2 | 5 | 6900 | 2.8 | $8 \times 10^4$ | 16 | −62 | −67 |
| | | | | 1300 | 2 | 4 | 7700 | 1.5 | $1 \times 10^5$ | 14 | −61 | −63 |
| | | | | 1350 | 3 | 5 | 8400 | 1.3 | $2 \times 10^5$ | 14 | −58 | −63 |
| 2 | 100 | 4 | 6 | 1250 | 2 | 3 | 9100 | 1.3 | $2 \times 10^5$ | 18 | −56 | −68 |
| | | | | 1300 | 2 | 2 | 9400 | 0.9 | $3 \times 10^5$ | 20 | −55 | −68 |
| | | | | 1350 | 3 | 3 | 9700 | 0.8 | $2 \times 10^5$ | 15 | −55 | −68 |
| 3 | 100 | 14/3 | 7 | 1250 | 2 | 2 | 10600 | 0.9 | $4 \times 10^5$ | 23 | −52 | −74 |
| | | | | 1300 | 2 | 3 | 9800 | 0.6 | $4 \times 10^5$ | 19 | −55 | −76 |
| | | | | 1350 | 2 | 3 | 9300 | 0.6 | $3 \times 10^5$ | 16 | −59 | −79 |
| 4 | 100 | 16/3 | 8 | 1250 | 2 | 2 | 9600 | 0.9 | $5 \times 10^5$ | 23 | −42 | −78 |
| | | | | 1300 | 2 | 2 | 8900 | 0.5 | $6 \times 10^5$ | 23 | −53 | −74 |
| | | | | 1350 | 3 | 3 | 8300 | 0.3 | $8 \times 10^5$ | 20 | −55 | −71 |
| 5* | 100 | 6 | 9 | 1250 | 2 | 2 | 7700 | 0.6 | $1 \times 10^6$ | 21 | −12 | −75 |
| | | | | 1300 | 3 | 3 | 6300 | 0.3 | $2 \times 10^6$ | 19 | −52 | −73 |
| | | | | 1350 | 3 | 2 | 5100 | 0.2 | $2 \times 10^6$ | 19 | −54 | −70 |
| Conventional | $BaTiO_3$(100) $BaZrO_3$(28) $CaTiO_3$(10) $ZnO_2$(2.5) $MnO_2$(0.2) $WO_3$(0.3) | | | 1380 | 16 | 23 | 11300 | 0.7 | $2 \times 10^6$ | 8 | −49 | −73 |

(Notes)
1. *: comparative example; T: calcination temperature; G: grain size; P: pore size; ε: dielectric constant; tanδ: dissipation factor; IR: insulation resistance; BDV: breakdown voltage; T.C: change in capacitance with respect to temperature (20° C. reference).
2. The dissipation factor tanδ is measured at an AC voltage of 1 V and at a frequency of 1 kH; the insulation resistance IR is measured when a DC voltage of 50 V is applied for 1 minute; and the breakdown voltage BDV is measured immediately before the respective elements break down as a voltage is continuously increased.

TABLE 2

| Composition | L (mm) | W (mm) | T (mm) | t (μm) | n | C (nF) | tanδ (%) | IRc (MΩ) | BDVc (kV) | F (Kg) |
|---|---|---|---|---|---|---|---|---|---|---|
| Composition No. 3 of the present invention | 3.03 | 1.51 | 1.02 | 35 | 23 | 153.4 | 1.2 | $5 \times 10^4$ | 1.3 | 10.6 |
| Conventional composition | 3.15 | 1.53 | 1.05 | 33 | 23 | 182.5 | 3.4 | $9 \times 10^4$ | 0.4 | 4.8 |

(Notes)
1. L: element length; W: element width; T: element thickness; t: thickness of dielectric layer 1; n: number of laminated layers; C: capacitance; tanδ: dissipation factor; IRc: insulation resistance; BDVc: breakdown voltage; F: force against bending (span of 1 mm).
2. The dissipation factor tanδ, the insulation resistance IRc and the breakdown voltage BDVc are measured in the same manner as in Table 1, and the force F is measured by the three-point measurement method.

As may be apparent from Table 1, composition Nos. 2, 3 and 4 can be used as materials which comply with EIA standards (Y 5V). More particularly, these compositions satisfy the required capacitance change (20° C. reference) of +22% to −82% in a temperature range of ness of 35 μm; 2, palladium electrodes; and 3, silver electrodes.

As may be apparent from Table 2, the laminated ceramic chip capacitor made of the material indicated by the composition No. 3 has a force against bending twice that of the conventional zirconate type capacitor, and a breakdown voltage three times that of the conventional capacitor. Furthermore, according to Tables 1 and 2, the dissipation factor tan δ of the capacitor of the material indicated by composition No. 3 has little dependency on voltage.

However, the composition described above has a slightly low insulation resistance. Furthermore, the color of the composition is vivid red, so that the palladium electrodes of the laminated ceramic chip capacitor can be observed through the dielectric layers. As a result, there is room for improvement.

DETAILED DESCRIPTION OF THE PREFERRED EMBODIMENTS

A preferred embodiment of a ceramic composition of the present invention, which solves the above-mentioned problems will be described in detail below.

Barium carbonate ($BaCO_3$) and titanium dioxide ($TiO_2$) were mixed such that a ratio of Ba to Ti was 1.000±0.005:1. The resultant mixture was then calcined at a temperature of 1,100° to 1,150° C. and was pulverized to obtain barium metatitanate ($BaTiO_3$). A hundred mol parts of $BaTiO_3$, (§)(7±1) mol parts of $CeO_3$, and 7±1 mol parts of $TiO_2$ were mixed together. Various amounts of $MnO_2$ were added respectively, to the mixture of $BaTiO_3$, $CeO_3$ and $TiO_2$. The binders were respectively added to the resultant compounds to form square plates, respectively. The square plates were then calcined at a temperature of 1,250° to 1,350° C. Thereafter, silver electrodes were formed on each of the calcined square dielectric plates to prepare capacitors.

Figure 3A:
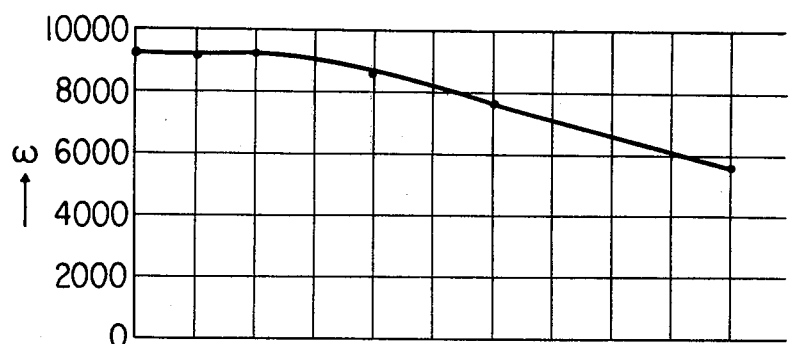
FIGS. 3A to 3C are graphs for explaining the dielectric constant $\epsilon$ of a square plate dielectric layer consisting of a ceramic composition of an embodiment of the present invention as a function of the amount of $MnO_2$ added to the ceramic composition of this embodiment, the dissipation factor tan δ as a function of the amount of $MnO_2$ added, and the insulation resistance IR as a function of the amount of $MnO_2$ added, respectively.
Figure 3B:
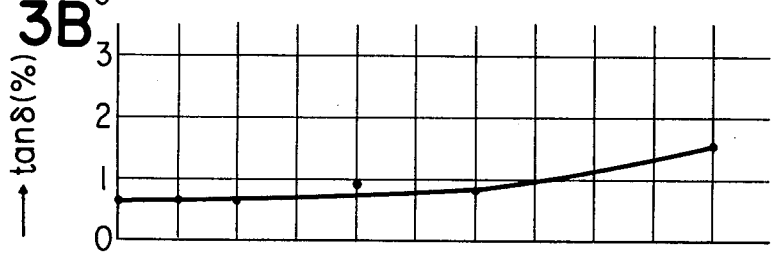
Figure 3C:
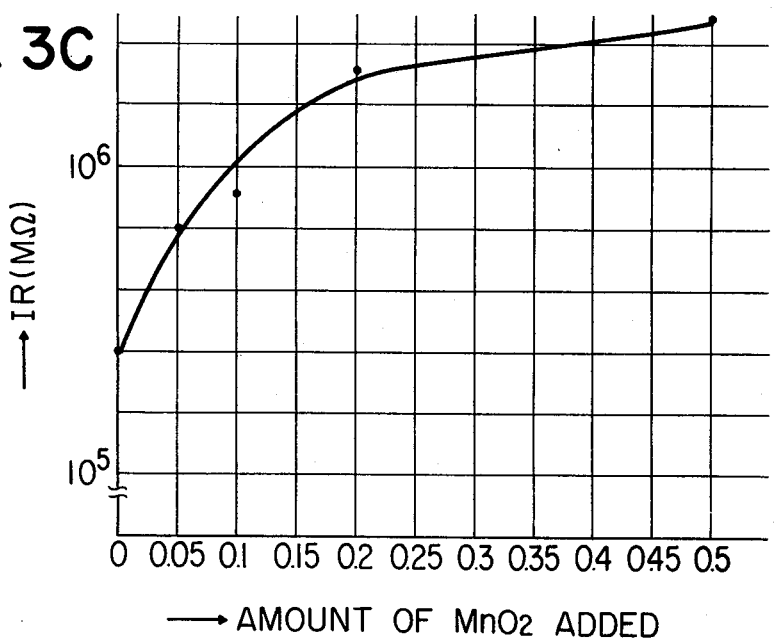

FIGS. 3A to 3C are graphs for explaining the electrical characteristics of the resultant dielectric plates as functions of the amounts of $MnO_2$ added to the respective composition described above. As may be apparent from FIG. 3A, the dielectric constant ε tends to decrease gradually as an increasing amount in excess of 0.2 mol part of $MnO_2$ is added to the composition. The dielectric loss angle tan δ shown in FIG. 3B increases as an increasing amount in excess of 0.5 mol part of $MnO_2$ is added to the composition. Furthermore, the insulation resistance IR shown in FIG. 3C increases proportionally as the amount of $MnO_2$ added to the composition increases.

It is noted that the dielectric plates described above are made of the composition indicated by composition No. 3 at a calcination temperature of 1,300° C. The dissipation factor tan δ and the insulation resistance IR are measured in the same manner as for Table 1.

Figure 2:
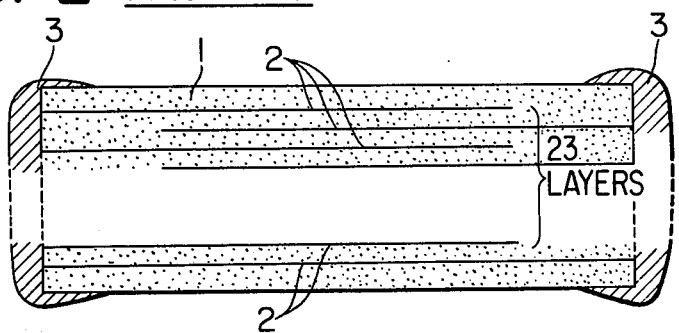
FIG. 2 is a sectional view of a laminated ceramic chip capacitor having the above-mentioned ceramic composition.

Laminated ceramic chip capacitors as shown in FIG. 2 were then prepared by using the composition which is indicated by composition No. 3 at a calcination temperature of 1,300° C. and which has various amounts of $MnO_2$ added thereto.

Figure 4A:
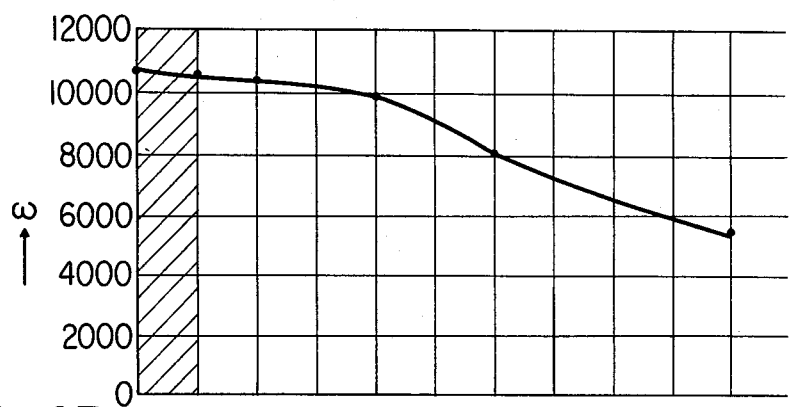
FIGS. 4A to 4C are graphs for explaining the dielectric constant $\epsilon$ of a laminated ceramic chip capacitor consisting of a ceramic composition of the present invention as a function of the amount of $MnO_2$ added to the ceramic composition of this embodiment, the dissipation factor tan δ as a function of the amount of $MnO_2$ added, and the insulation resistance IR as a function of the amount of $MnO_2$ added, respectively.
Figure 4B:
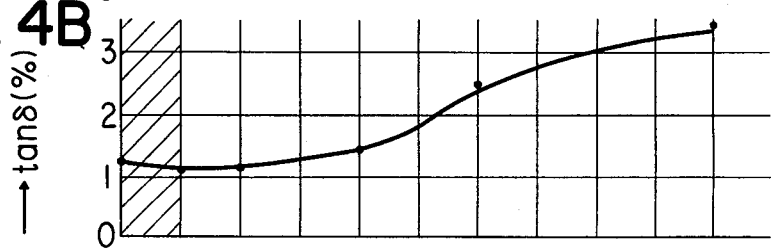
Figure 4C:
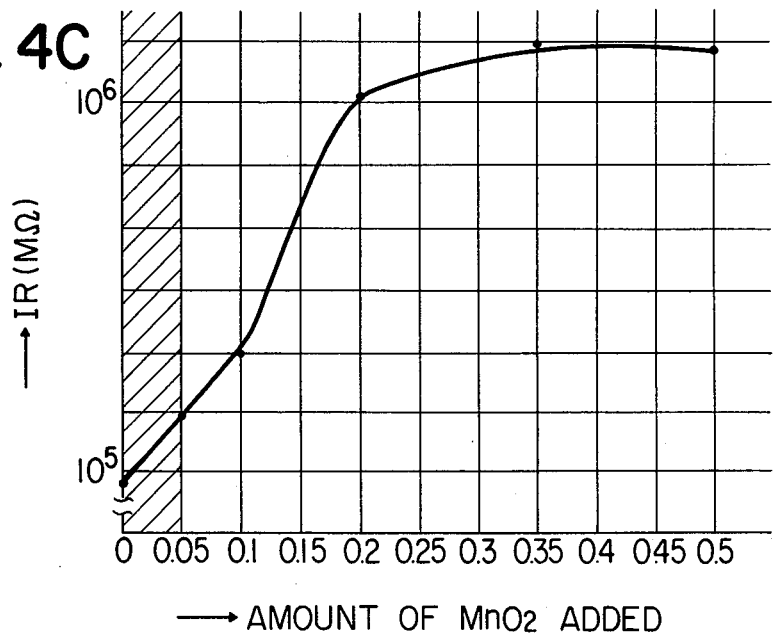

FIGS. 4A to 4C are graphs for explaining the electrical characteristics of the laminated ceramic chip capacitors as functions of the amount of MnO added to the composition, respectively. The hatched portions in FIGS. 4A to 4C indicate portions at which the palladium electrodes can be seen through the dielectric layer of 35 μm thickness. As may be apparent from FIGS. 4A to 4C, the electrical characteristics of the capacitors are influenced more greatly than those of the square dielectric plates. The dielectric constant ε shown in FIG. 4A is greatly decreased as an increasing amount in excess of 0.2 mol part of $MnO_2$ is added to the composition; the dielectric constant ε is not substantially changed when the amount of $MnO_2$ does not exceed 0.2 mol part. The insulation resistance IR shown in FIG. 4C is increased by about five times when the amount of $MnO_2$ is 0.2 mol part, as compared with the capacitor which does not contain any $MnO_2$. The dissipation factor tan δ shown in FIG. 4B increases as an increasing amount of $MnO_2$ in excess of 0.3 mol part is added.

When compositions indicated by composition Nos. 2 and 4 in Table 1 are used and No. 3 except that calcined at a temperature of 1,300° C. are used, it is found that the same effects can be obtained in the same manner as in the composition indicated by composition No. 3.

The optimal amount of $MnO_2$ falls within a range of 0.05 mol part to 0.2 mol part. When 0.05 mol part of $MnO_2$ is added, the palladium electrodes may not be observed through the dielectric layers. Furthermore, addition of 0.2 mol part of $MnO_2$ allows a state immediately prior to the abrupt decrease in the dielectric constant.

The average grain size of the ceramic was 2 to 3 μm, and the average pore size was not more than 2 to 3 μm.

Any electrical characteristics other than the dielectric constant ε, the dissipation factor tan δ, and the insulation resistance IR remain constant, independently of the addition of $MnO_2$.

In the above example, the barium titanate is prepared using barium carbonate and titanium dioxide. However, commercially available barium titanate may also be used.

As described above, the ceramic composition of the present invention has a ceramic microstructure in which a grain size is small, only a small number of pores is present, and a pore size is also small. Furthermore, the ceramic composition has a high dielectric constant, a high breakdown voltage, and little dependency on voltage. When a small amount of $MnO_2$ is added, the insulation (dielectric) resistance is further improved. Furthermore, although the palladium electrodes can be seen through the dielectric layers without addition of $MnO_2$, such a drawback can be eliminated by the addition of $MnO_2$. Thus, the composition of the present invention has a great advantage as used in laminated ceramic chip capacitors for a variety of industrial applications.

What is claimed is:

1. A ceramic composition of a high dielectric constant, characterized by a microstructure of average grain size from about 2 to 3 microns and average pore size of not more than about 3 microns, in which 0.05 to 0.2 mol part of manganese dioxide ($MnO_2$) is present in a composition which consists of 100 mol parts of barium metatitanate ($BaTiO_3$), (§)(7±1) mol parts of cerium dioxide ($CeO_2$), and 7±1 mol parts of titanium dioxide ($TiO_2$).

* * * * *